US010902300B2

(12) United States Patent
Sun et al.

(10) Patent No.: US 10,902,300 B2
(45) Date of Patent: Jan. 26, 2021

(54) METHOD AND APPARATUS FOR TRAINING FINE-GRAINED IMAGE RECOGNITION MODEL, FINE-GRAINED IMAGE RECOGNITION METHOD AND APPARATUS, AND STORAGE MEDIUMS

(71) Applicant: BAIDU ONLINE NETWORK TECHNOLOGY (BEIJING) CO., LTD., Beijing (CN)

(72) Inventors: Ming Sun, Beijing (CN); Yuchen Yuan, Beijing (CN); Feng Zhou, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 140 days.

(21) Appl. No.: 16/205,005

(22) Filed: Nov. 29, 2018

(65) Prior Publication Data
US 2019/0171904 A1  Jun. 6, 2019

(30) Foreign Application Priority Data
Dec. 1, 2017  (CN) .......................... 2017 1 1249014

(51) Int. Cl.
*G06K 9/62* (2006.01)
*G06K 9/46* (2006.01)
(Continued)

(52) U.S. Cl.
CPC ......... *G06K 9/628* (2013.01); *G06K 9/00684* (2013.01); *G06K 9/46* (2013.01);
(Continued)

(58) Field of Classification Search
CPC .... G06K 9/6267; G06K 9/6256; G06K 9/627; G06K 9/46; G06K 9/4628; G06K 9/4642;
(Continued)

(56) References Cited

U.S. PATENT DOCUMENTS

2015/0030238 A1   1/2015  Yang et al.
2016/0307072 A1*  10/2016  Zhou ......................... G06K 9/66
2017/0256068 A1*  9/2017  Wang ......................... G06T 7/74

FOREIGN PATENT DOCUMENTS

| CN | 105224937 A | 1/2016 |
| CN | 105930841 A | 9/2016 |
| CN | 106127232 A | 11/2016 |

OTHER PUBLICATIONS

First Office Action and Search Report from CN app. No. 201711249014.7, dated Mar. 4, 2019 with English translation from Global Dossier.

(Continued)

*Primary Examiner* — Ajibola A Akinyemi
(74) *Attorney, Agent, or Firm* — Ladas & Parry, LLP

(57) ABSTRACT

The present disclosure provides a method and apparatus for training a fine-grained image recognition model, a device and a storage medium. The method comprises: obtaining images as training samples, and respectively obtaining a tag corresponding to each image, the tag including a class to which the image belongs; training according to the training samples and corresponding tags to obtain a fine-grained image recognition model, and performing constraint at a feature level from two dimensions, namely, the class and object parts, during the training, so that the fine-grained image recognition model learns key object parts in the images; upon performing the fine-grained image recognition, inputting a to-be-recognized image to the fine-grained image recognition model, so that the fine-grained image recognition model positions key object parts in the image, and completes fine-grained image classification according to the key object parts, and outputs a classification result. The solution of the present disclosure can be applied to save manpower costs and improve the model training efficiency.

11 Claims, 5 Drawing Sheets

(51) Int. Cl.
 *G06N 20/00* (2019.01)
 *G06K 9/00* (2006.01)
(52) U.S. Cl.
 CPC ......... *G06K 9/4628* (2013.01); *G06K 9/6215* (2013.01); *G06K 9/6227* (2013.01); *G06K 9/6228* (2013.01); *G06K 9/6257* (2013.01); *G06K 9/6274* (2013.01); *G06N 20/00* (2019.01)
(58) Field of Classification Search
 CPC .. G06K 9/6201; G06K 9/6226; G06K 9/6262; G06K 2009/4666; G06K 9/52; G06K 9/621; G06K 9/6218; G06K 9/6232; G06K 9/6271; G06K 9/66; G06K 9/00624; G06K 9/00664; G06K 9/00684
 USPC ........................................................ 382/159
 See application file for complete search history.

(56) References Cited

OTHER PUBLICATIONS

Second Office Action and Search Report from CN app. No. 201711249014.7, dated Jun. 4, 2019 with English translation from Global Dossier.
Notice of Allowance and Search Report from CN app. No. 201711249014.7, dated Aug. 23, 2019 with English translation from Global Dossier.
Zhang et al., "Part-Based R-CNNs for Fine-Grained Category Detection", University of California, Berkeley, USA, ECCV 2014, Part I, LNCS 8069, pp. 834-849, 2014.
Wei, Zhiyuan "A Review of Progress in Fine-Grained Image Analysis", Apr. 18, 2017, https./www.sohu.com/a/134784420_473283.

* cited by examiner

US 10,902,300 B2

METHOD AND APPARATUS FOR TRAINING FINE-GRAINED IMAGE RECOGNITION MODEL, FINE-GRAINED IMAGE RECOGNITION METHOD AND APPARATUS, AND STORAGE MEDIUMS

The present application claims the priority of Chinese Patent Application No. 201711249014.7, filed on Dec. 1, 2017, with the title of "Method and apparatus for training fine-grained image recognition model, fine-grained image recognition method and apparatus, and storage mediums". The disclosure of the above application is incorporated herein by reference in its entirety.

FIELD OF THE DISCLOSURE

The present disclosure relates to fine-grained image recognition technologies, and particularly to a method and apparatus for training a fine-grained image recognition model, a fine-grained image recognition method and apparatus, and storage mediums.

BACKGROUND OF THE DISCLOSURE

Fine-grained image recognition is a very hot subject of research appearing the fields such as computer vision and mode recognition in recent years, and its purpose is to perform finer subclass division for coarse-grained large classes.

As compared with coarse-grained image classification tasks, fine-grained image classes are different finer, and usually different classes can be distinguished only by virtue of tiny local differences.

Fine-grained image recognition may include recognizing animals such as birds in different classes, flowers in different classes, vehicles in different classes, dishes in different classes and so on.

In the field of fine-grained image recognition, positioning and representation of object parts are of great importance. Conventional fine-grained image recognition methods mostly depend on manual annotation of the object parts, the recognition model is trained by annotating training samples, and the recognition model is used to perform fine-grained image recognition for to-be-recognized images, to obtain fine-grained image classification results. This manner undoubtedly increases manpower costs and reduces the model training efficiency.

SUMMARY OF THE DISCLOSURE

In view of the above, the present disclosure provides a method and apparatus for training a fine-grained image recognition model, a fine-grained image recognition method and apparatus, and storage mediums, which can save manpower costs and improve the model training efficiency.

Specific technical solutions are as follows:

A method for training a fine-grained image recognition model, comprising:

obtaining images as training samples, and respectively obtaining a tag corresponding to each image, the tag including a class to which the image belongs;

training according to the training samples and corresponding tags to obtain a fine-grained image recognition model, and performing constraint at a feature level from two dimensions, namely, the class and object parts, during the training, so that the fine-grained image recognition model learns key object parts in the images, and completes fine-grained image classification according to the key object parts.

According to a preferred embodiment of the present disclosure, the performing constraint at a feature level from two dimensions, namely, the class and object parts, comprises:

a distance between two features extracted from the same object part in the images in the same class simultaneously satisfies: smaller than a distance between two features extracted from different object parts in the images in the same class; smaller than a distance between two features extracted from the same object part in the images in different classes; smaller than a distance between two features extracted from different object parts in the images in different classes;

a distance between two features extracted from different object parts in the images in the same class satisfies: smaller than a distance between two features extracted from different object parts in the images in different classes;

a distance between two features extracted from the same object part in the images in different classes satisfies: smaller than a distance between two features extracted from different object parts in the images in different classes.

According to a preferred embodiment of the present disclosure, the fine-grained image recognition model at least comprises two branches;

during training, regarding each image, each branch performs feature extraction for one object part in the image;

upon completion of the training, each branch respectively learns different key object parts in the image, so as to complete fine-grained image classification in combination with features extracted by each branch.

A fine-grained image recognition method, comprising:

obtaining a to-be-recognized image;

inputting the to-be-recognized image to a fine-grained image recognition model obtained by pre-training, so that the fine-grained image recognition model positions key object parts in the image, and completes fine-grained image classification according to the key object parts, and outputs a classification result.

According to a preferred embodiment of the present disclosure, before obtaining a to-be-recognized image, the method further comprises:

obtaining images as training samples, and respectively obtaining a tag corresponding to each image, the tag including a class to which the image belongs;

training according to the training samples and corresponding tags to obtain the fine-grained image recognition model, and performing constraint at a feature level from two dimensions, namely, the class and object parts, during the training, so that the fine-grained image recognition model learns key object parts in the images, and completes fine-grained image classification according to the key object parts.

According to a preferred embodiment of the present disclosure, the performing constraint at a feature level from two dimensions, namely, the class and object parts, comprises:

a distance between two features extracted from the same object part in the images in the same class simultaneously satisfies: smaller than a distance between two features extracted from different object parts in the images in the same class; smaller than a distance between two features extracted from the same object part in the images in different classes; smaller than a distance between two features extracted from different object parts in the images in different classes;

a distance between two features extracted from different object parts in the images in the same class satisfies: smaller than a distance between two features extracted from different object parts in the images in different classes;

a distance between two features extracted from the same object part in the images in different classes satisfies: smaller than a distance between two features extracted to from different object parts in the images in different classes.

According to a preferred embodiment of the present disclosure, the fine-grained image recognition model at least comprises two branches;

during training, regarding each image, each branch performs feature extraction for one object part in the image;

upon completion of the training, each branch respectively learns different key object parts in the image, so as to complete fine-grained image classification in combination with features extracted by each branch.

An apparatus for training a fine-grained image recognition model, comprising: a sample obtaining unit and a model training unit;

the sample obtaining unit is configured to obtain images as training samples, and respectively obtain a tag corresponding to each image, the tag including a class to which the image belongs;

the model training unit is configured to train according to the training samples and corresponding tags to obtain a fine-grained image recognition model, and perform constraint at a feature level from two dimensions, namely, the class and object parts, during the training, so that the fine-grained image recognition model learns key object parts in the images, and completes fine-grained image classification according to the key object parts.

According to a preferred embodiment of the present disclosure, the performing constraint at a feature level from two dimensions, namely, the class and object parts, comprises:

a distance between two features extracted from the same object part in the images in the same class simultaneously satisfies: smaller than a distance between two features extracted from different object parts in the images in the same class; smaller than a distance between two features extracted from the same object part in the images in different classes; smaller than a distance between two features extracted from different object parts in the images in different classes;

a distance between two features extracted from different object parts in the images in the same class satisfies: smaller than a distance between two features extracted from different object parts in the images in different classes;

a distance between two features extracted from the same object part in the images in different classes satisfies: smaller than a distance between two features extracted from different object parts in the images in different classes.

According to a preferred embodiment of the present disclosure, the fine-grained image recognition model at least comprises two branches;

during training, regarding each image, each branch performs feature extraction for one object part in the image;

upon completion of the training, each branch respectively learns different key object parts in the image, so as to complete fine-grained image classification in combination with features extracted by each branch.

A fine-grained image recognition apparatus, comprising: an image obtaining unit and an image recognizing unit;

the image obtaining unit is configured to obtain a to-be-recognized image;

the image recognizing unit is configured to input the to-be-recognized image to a fine-grained image recognition model obtained by pre-training, so that the fine-grained image recognition model positions key object parts in the image, and completes fine-grained image classification according to the key object parts, and outputs a classification result.

According to a preferred embodiment of the present disclosure, the apparatus further comprises: a pre-processing unit;

the pre-processing unit is configured to obtain images as training samples, and respectively obtain a tag corresponding to each image, the tag including a class to which the image belongs; train according to the training samples and corresponding tags to obtain the fine-grained image recognition model, and perform constraint at a feature level from two dimensions, namely, the class and object parts, during the training, so that the fine-grained image recognition model learns key object parts in the images, and completes fine-grained image classification according to the key object parts.

According to a preferred embodiment of the present disclosure, the performing constraint at a feature level from two dimensions, namely, the class and object parts, comprises:

a distance between two features extracted from the same object part in the images in the same class simultaneously satisfies: smaller than a distance between two features extracted from different object parts in the images in the same class; smaller than a distance between two features extracted from the same object part in the images in different classes; smaller than a distance between two features extracted from different object parts in the images in different classes;

a distance between two features extracted from different object parts in the images in the same class satisfies: smaller than a distance between two features extracted from different object parts in the images in different classes;

a distance between two features extracted from the same object part in the images in different classes satisfies: smaller than a distance between two features extracted from different object parts in the images in different classes.

According to a preferred embodiment of the present disclosure, the fine-grained image recognition model at least comprises two branches;

during training, regarding each image, each branch performs feature extraction for one object part in the image;

upon completion of the training, each branch respectively learns different key object parts in the image, so as to complete fine-grained image classification in combination with features extracted by each branch.

A computer device, comprising a memory, a processor and a computer program which is stored on the memory and runs on the processor, the processor, upon executing the program, implementing the above-mentioned method.

A computer-readable storage medium on which a computer program is stored, the program, when executed by the processor, implementing the aforesaid method.

As can be seen from the above introduction, according to solutions of the present disclosure, it is possible to obtain images as training samples, and respectively obtain a tag corresponding to each image, the tag including a class to which the image belongs, and then train according to the training samples and corresponding tags to obtain a fine-grained image recognition model, and perform constraint at a feature level from two dimensions, namely, the class and object parts, during the training, so that the fine-grained image recognition model learns key object parts in the images, and completes fine-grained image classification according to the key object parts. After the training of the fine-grained image recognition model is completed, the fine-grained image recognition model may be used to perform actual fine-grained image recognition. In the solution of the present disclosure as compared with the prior art, it is unnecessary to perform manual annotation for object parts, thereby saving manpower costs and improving the model training efficiency. Furthermore, it is possible to, by performing constraint at the feature level, enable the fine-grained image recognition model to accurately position key object parts in the image, thereby ensuring the accuracy of the fine-grained image recognition results.

DETAILED DESCRIPTION OF PREFERRED EMBODIMENTS

Technical solutions of the present disclosure will be described in more detail in conjunction with figures and embodiments to make technical solutions of the present disclosure clear and more apparent.

Obviously, the described embodiments are partial embodiments of the present disclosure, not all embodiments. Based on embodiments in the present disclosure, all other embodiments obtained by those having ordinary skill in the art without making inventive efforts all fall within the protection scope of the present disclosure.

Figure 1:
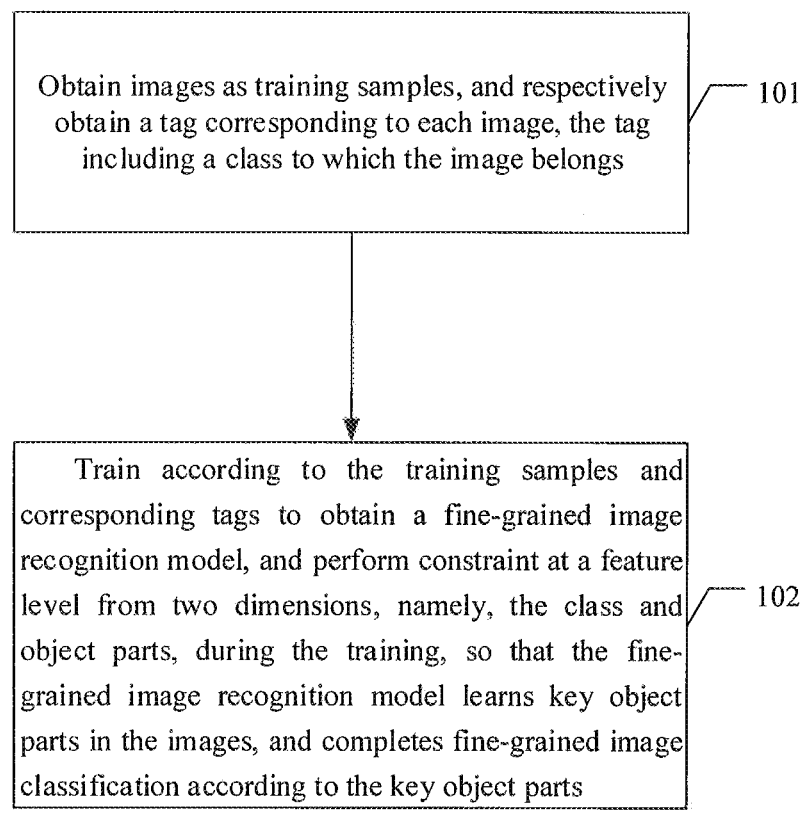
FIG. 1 is a flow chart of an embodiment of a method for training a fine-grained image recognition model according to the present disclosure.

FIG. 1 is a flow chart of an embodiment of a method for training a fine-grained image recognition model according to the present disclosure. As shown in FIG. 1, the embodiment comprises the following specific implementation mode.

At 101, obtain images as training samples, and respectively obtain a tag corresponding to each image, the tag including a class to which the image belongs.

At 102, train according to the training samples and corresponding tags to obtain a fine-grained image recognition model, and perform constraint at a feature level from two dimensions, namely, the class and object parts, during the training, so that the fine-grained image recognition model learns key object parts in the images, and completes fine-grained image classification according to the key object parts.

In conventional fine-grained image recognition method, usually only the whole class information of image levels is used to perform model training constraint, and the used information is limited.

The relationship between the object parts in the images contains rich information, and has a potential of further improving the fine-grained image recognition precision. Hence, in the present embodiment, it is possible to improve the whole recognition performance through the rich part constraint relationship between different images and between different object parts in the same image.

Correspondingly, it is possible to introduce two constraints during the training of the fine-grained image recognition model: one is conventionally using the whole class information of image levels to constrain the model training, and the other is constraint at a feature level performed from two dimensions, namely, the class and the object parts, so that the fine-grained image recognition model learns key object parts in the image, and complete the fine-grained image classification according to the key object parts.

The fine-grained image recognition model is usually a neural network model.

To train to obtain the fine-grained image recognition model, it is necessary to first obtain images as training samples, and respectively obtain a tag corresponding to each image, the tag including: a class to which the image belongs.

How to obtain the tag corresponding to each image may depend on actual needs, for example, the tag may be obtained through manual annotation, or images in known classes may be directly regarded as the training samples.

Then, it is possible to obtain the fine-grained image recognition model according to the training samples and corresponding tags, and perform constraint at a feature level from two dimensions, namely, the class and object parts, during the training.

Performing constraint at a feature level from two dimensions, namely, the class and object parts, may comprise:

1) A distance between two features extracted from the same object part in the images in the same class simultaneously satisfies: smaller than a distance between two features extracted from different object parts in the images in the same class; smaller than a distance between two features extracted from the same object part in the images in different classes; smaller than a distance between two features extracted from different object parts in the images in different classes;

2) A distance between two features extracted from different object parts in the images in the same class satisfies: smaller than a distance between two features extracted from different object parts in the images in different classes;

3) A distance between two features extracted from the same object part in the images in different classes satisfies: smaller than a distance between two features extracted from different object parts in the images in different classes.

Figure 2:
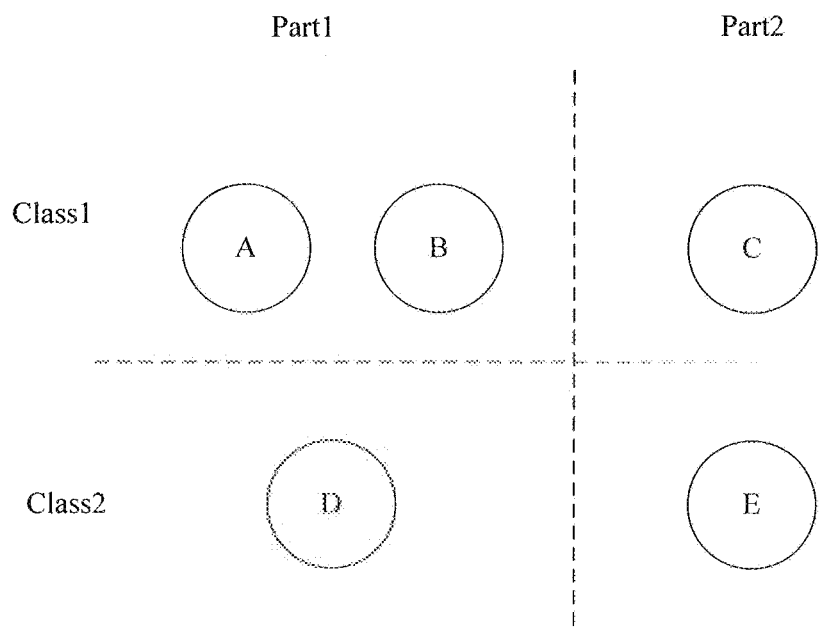
FIG. 2 is a schematic diagram of a relationship between image classes and object parts according to the present disclosure.

FIG. 2 is a schematic diagram of a relationship between image classes and object parts according to the present disclosure. As shown in FIG. 2, both letter A and letter B represent a feature extracted from object part 1 in an image whose class is Class1, letter C represents a feature extracted from object part 2 in an image whose class is Class1, letter D represents a feature extracted from object part 1 in an image whose class is Class2, and letter E represents a feature extracted from object part 2 in an image whose class is Class2.

Figure 3:
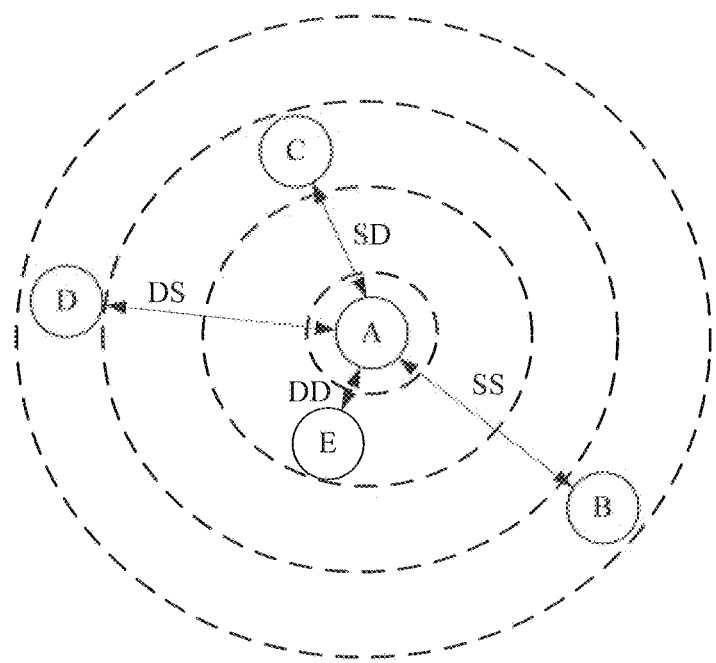
FIG. 3 is a first schematic diagram of distances between different features according to the present disclosure.
Figure 4:
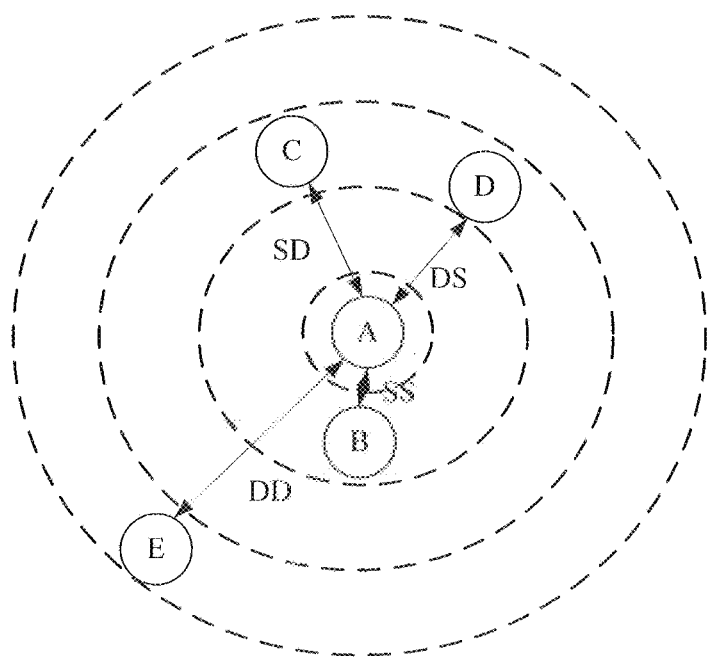
FIG. 4 is a second schematic diagram of distances between different features according to the present disclosure.

It is assumed that SS is used to represent the distance between two features extracted from the same object part in the images in the same class, namely, a distance between A and B, SD is used to represent the distance between two features extracted from different object parts in the images in the same class, namely, a distance between A and C, DS is used to represent the distance between two features extracted from the same object part in the images in different classes, namely, a distance between A and D, and DD is used to represent the distance between two features extracted from different object parts in the images in different classes, namely, a distance between A and E. It is desirable to transform the distance between different features from a disordered state shown in FIG. 3 to a state shown in FIG. 4 through the constraints stated in the present embodiment. FIG. 3 is a first schematic diagram of distances between different features according to the present disclosure. FIG. 4 is a second schematic diagram of distances between different features according to the present disclosure. As shown in FIG. 4, it is necessary to satisfy SS<SD, SS<DS, SS<DD, SD<DD and DS<DD. The dotted-line circles in FIG. 3 and FIG. 4 represent the size of the distance. A larger circle represents a further distance.

In practical application, the fine-grained image recognition model may at least comprise two branches, preferably the number of the branches may be two. During training, regarding each image, each branch performs feature extraction for one object part in the image. Upon completion of the training, each branch respectively learns different key object parts in the image, so as to complete fine-grained image classification in combination with features extracted by each branch.

Figure 5:
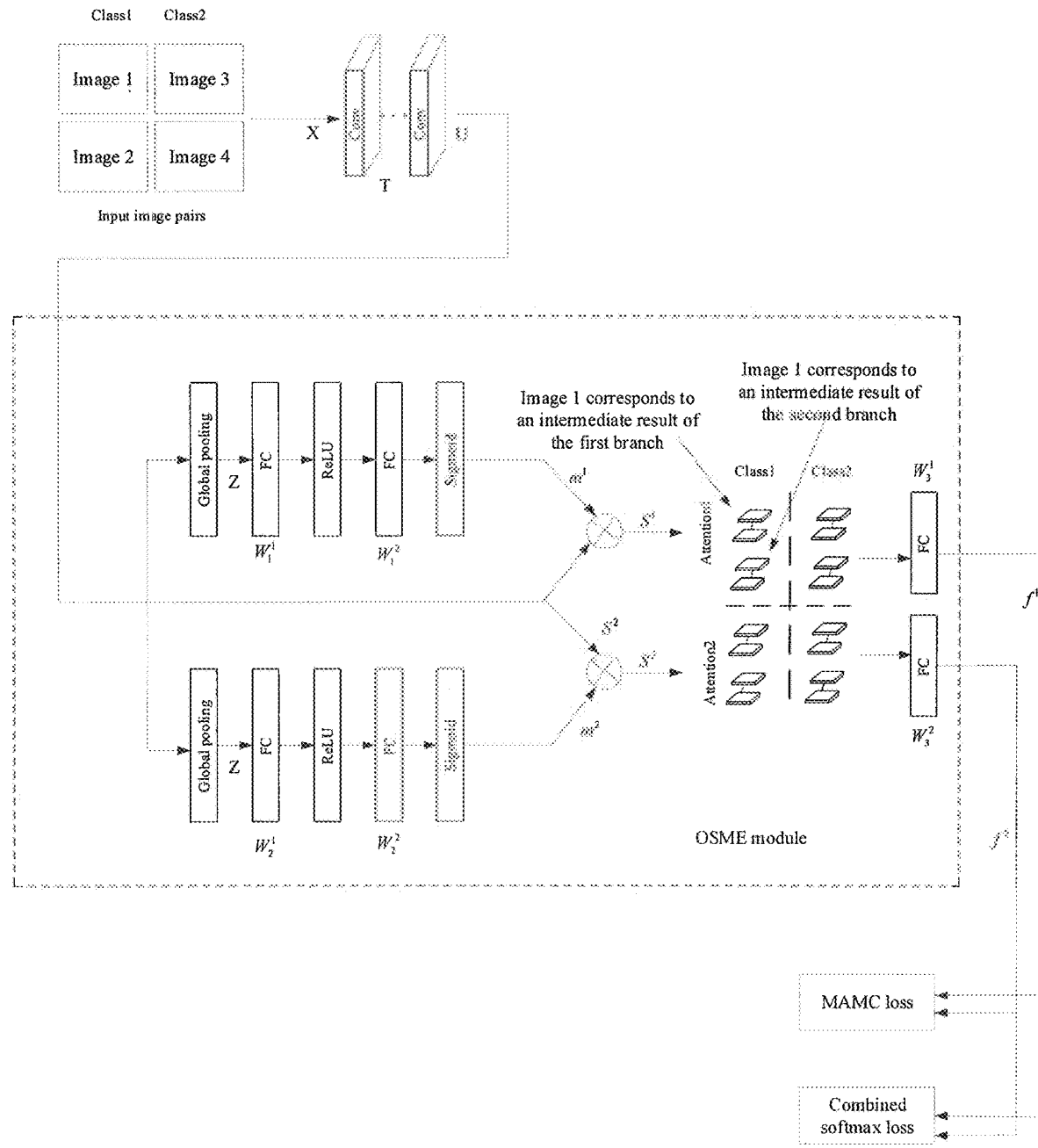
FIG. 5 is a schematic diagram of a training process of a fine-grained image recognition model according to the present disclosure.

FIG. 5 is a schematic diagram of a training process of the fine-grained image recognition model according to the present disclosure. As shown in FIG. 5, it is assumed that four images are input each time, as pairs. For ease of depictions, the four images are respectively called image 1, image 2, image 3 and image 4, wherein image 1 and image 2 belong to the same class Class1, and image 3 and image 4 belong to the same class Class2. The intermediate results of image 1 respectively corresponding to the two branches as shown in FIG. 5. The lower side, the right side and the lower right side of the intermediate results of image 1 respectively corresponding to the two branches, respectively represents: the intermediate results of image 2 respectively corresponding to the two branches, the intermediate results of image 3 respectively corresponding to the two branches, and the intermediate results of image 4 respectively corresponding to the two branches. Each image respectively passes by the two branches, to finally obtain two features f1 and f2. It is possible to perform image classification (Combined softmax loss) in combination with f1 and f2. MAMC loss is used to constrain the distance relationship between different features, so that the two branches respectively learn different object parts.

After the training of the fine-grained image recognition model is completed in the above manner, different branches will respectively learn different key object parts in the image, each branch corresponds to a key object part, and each branch corresponds to a feature.

Assuming that feature a is a feature of the part "bird head" extracted from image a, feature b is a feature of the part "bird head" extracted from the image b, and feature c is a feature of the part "bird tail" extracted from image a or image c, the class to which image a, image b and image c belong is "woodpecker". Then, in the manner stated in the present embodiment, the distance between feature a and feature b is required to be smaller than the distance between feature a and feature c. It is believed that as compared with "bird head" and "bird tail", "bird head" and "bird head" are closer spatially, so that the branches respectively concern different object parts.

Figure 6:
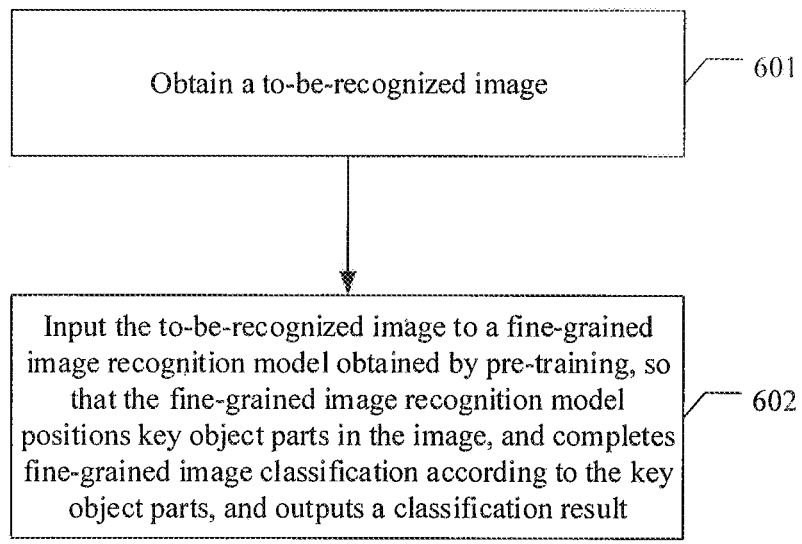
FIG. 6 is a flow chart of an embodiment of a fine-grained image recognition method according to the present disclosure.

FIG. 6 is a flow chart of an embodiment of a fine-grained image recognition method according to the present disclosure. As shown in FIG. 6, the embodiment comprises the following specific implementation mode.

At 601, obtain a to-be-recognized image.

At 602, input the to-be-recognized image to a fine-grained image recognition model obtained by pre-training, so that the fine-grained image recognition model positions key object parts in the image, and completes fine-grained image classification according to the key object parts, and outputs a classification result.

As can be seen from the above, it is necessary to pre-train to obtain the fine-grained image recognition model to implement the solution of the present embodiment.

Specifically, it is first possible obtain images as training samples, and respectively obtain a tag corresponding to each training sample, the tag including a class to which the training sample belongs. Then it is possible to train according to the training samples and corresponding tags to obtain the fine-grained image recognition model, and perform constraint at a feature level from two dimensions, namely, the class and object parts, during the training, so that the fine-grained image recognition model learns key object parts in the images, and completes fine-grained image classification according to the key object parts.

Performing constraint at a feature level from two dimensions, namely, the class and object parts, may comprise:

1) A distance between two features extracted from the same object part in the images in the same class simultaneously satisfies: smaller than a distance between two features extracted from different object parts in the images in the same class; smaller than a distance between two features extracted from the same object part in the images in different classes; smaller than a distance between two features extracted from different object parts in the images in different classes;

2) A distance between two features extracted from different object parts in the images in the same class satisfies: smaller than a distance between two features extracted from different object parts in the images in different classes;

3) A distance between two features extracted from the same object part in the images in different classes satisfies: smaller than a distance between two features extracted from different object parts in the images in different classes.

The fine-grained image recognition model may at least comprise two branches. During training, regarding each image, each branch performs feature extraction for one object part in the image. Upon completion of the training, each branch respectively learns different key object parts in the image.

When the practical fine-grained image recognition is performed, the to-be-recognized image, after being obtained, may be input to the fine-grained image recognition model. Assuming that the fine-grained image recognition model comprises two branches, it is possible to obtain two features, perform classification for the to-be-recognized image in conjunction with the two features, and obtain and output the classification result.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In the above embodiments, different emphasis is placed on respective embodiments, and reference may be made to related depictions in other embodiments for portions not detailed in a certain embodiment.

To sum up, according to the solutions in the above method embodiments, when the fine-grained image recognition model is trained, it is unnecessary to perform manual annotation for object parts, thereby saving manpower costs and improving the model training efficiency. Furthermore, it is possible to, by performing constraint at the feature level, enable the fine-grained image recognition model to accurately position key object parts in the image, thereby ensuring the accuracy of the fine-grained image recognition results. In addition, the solutions in the above method embodiments can be very easily extended to large vertical classes of the fine-grained image recognition, for example, animals, flowers, vehicles and dishes, and has broad applicability.

The above introduces the method embodiments. The solution of the present disclosure will be further described through an apparatus embodiment.

Figure 7:
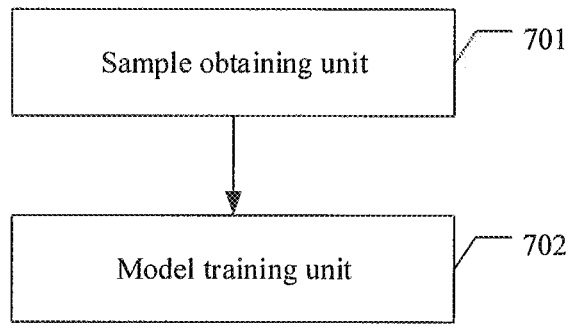
FIG. 7 is a structural schematic diagram of components of an embodiment of an apparatus for training a fine-grained image recognition model according to the present disclosure.

FIG. 7 is a structural schematic diagram of components of an embodiment of an apparatus for training a fine-grained image recognition model according to the present disclosure. As shown in FIG. 7, the apparatus comprises: a sample obtaining unit 701 and a model training unit 702.

The sample obtaining unit 701 is configured to obtain images as training samples, and respectively obtain a tag corresponding to each image, the tag including a class to which the image belongs.

The model training unit 702 is configured to train according to the training samples and corresponding tags to obtain a fine-grained image recognition model, and perform constraint at a feature level from two dimensions, namely, the class and object parts, during the training, so that the fine-grained image recognition model learns key object parts in the images, and completes fine-grained image classification according to the key object parts.

In conventional fine-grained image recognition method, usually only the whole class information of image levels is used to perform model training constraint, and the used information is limited.

In the present embodiment, it is possible to introduce two constraints during the training of the fine-grained image recognition model: one is conventionally using the whole class information of image levels to constrain the model training, and the other is constraint at a feature level performed from two dimensions, namely, the class and the object parts, so that the fine-grained image recognition model learns key object parts in the image, and complete the fine-grained image classification according to the key object parts.

The fine-grained image recognition model is usually a neural network model.

To train to obtain the fine-grained image recognition model, the sample obtaining unit 701 first obtains images as training samples, and respectively obtains a tag corresponding to each training sample, the tag including a class to which the training sample belongs.

Then, the model training unit 702 may obtain the fine-grained image recognition model according to the training samples and corresponding tags, and perform constraint at a feature level from two dimensions, namely, the class and object parts, during the training.

Performing constraint at a feature level from two dimensions, namely, the class and object parts, may comprise:

1) A distance between two features extracted from the same object part in the images in the same class simultaneously satisfies: smaller than a distance between two features extracted from different object parts in the images in the same class; smaller than a distance between two features extracted from the same object part in the images in different classes; smaller than a distance between two features extracted from different object parts in the images in different classes;

2) A distance between two features extracted from different object parts in the images in the same class satisfies: smaller than a distance between two features extracted from different object parts in the images in different classes;

3) A distance between two features extracted from the same object part in the images in different classes satisfies: smaller than a distance between two features extracted from different object parts in the images in different classes.

In practical application, the fine-grained image recognition model may at least comprise two branches, preferably the number of the branches may be two. During training, regarding each image, each branch performs feature extraction for one object part in the image. Upon completion of the training, each branch respectively learns different key object parts in the image, so as to complete fine-grained image classification in combination with features extracted by each branch.

Figure 8:
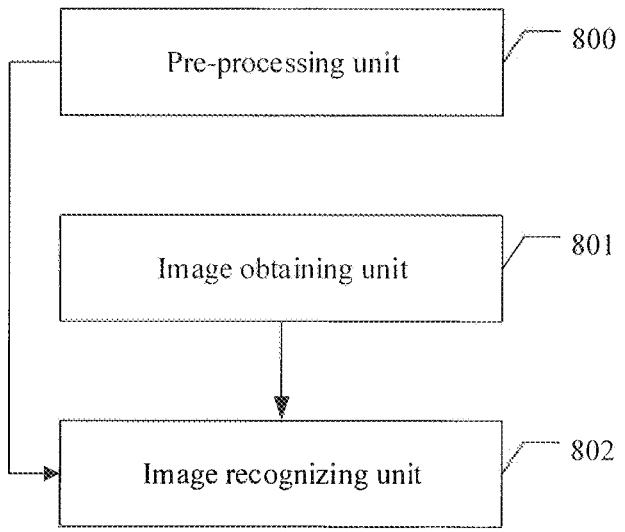
FIG. 8 is a structural schematic diagram of components of an embodiment of a fine-grained image recognition apparatus according to the present disclosure.

FIG. 8 is a structural schematic diagram of components of an embodiment of a fine-grained image recognition apparatus according to the present disclosure. As shown in FIG. 8, the apparatus comprises: an image obtaining unit 801 and an image recognizing unit 802.

The image obtaining unit 801 is configured to obtain a to-be-recognized image.

The image recognizing unit 802 is configured to input the to-be-recognized image to a fine-grained image recognition model obtained by pre-training, so that the fine-grained image recognition model positions key object parts in the image, and completes fine-grained image classification according to the key object parts, and outputs a classification result.

As can be seen from the above, it is necessary to pre-train to obtain the fine-grained image recognition model to implement the solution of the present embodiment. Correspondingly, the apparatus shown in FIG. 8 may further comprise: a pre-processing unit 800.

The pre-processing unit 800 is configured to obtain images as training samples, and respectively obtain a tag corresponding to each image, the tag including a class to which the image belongs; train according to the training samples and corresponding tags to obtain the fine-grained image recognition model, and perform constraint at a feature level from two dimensions, namely, the class and object parts, during the training, so that the fine-grained image recognition model learns key object parts in the images, and completes fine-grained image classification according to the key object parts.

Performing constraint at a feature level from two dimensions, namely, the class and object parts, may comprise:

1) A distance between two features extracted from the same object part in the images in the same class simultaneously satisfies: smaller than a distance between two features extracted from different object parts in the images in the same class; smaller than a distance between two features extracted from the same object part in the images in different classes; smaller than a distance between two features extracted from different object parts in the images in different classes;

2) A distance between two features extracted from different object parts in the images in the same class satisfies: smaller than a distance between two features extracted from different object parts in the images in different classes;

3) A distance between two features extracted from the same object part in the images in different classes satisfies: smaller than a distance between two features extracted from different object parts in the images in different classes.

The fine-grained image recognition model may at least comprise two branches. During training, regarding each image, each branch performs feature extraction for one object part in the image. Upon completion of the training, each branch respectively learns different key object parts in the image.

When the practical fine-grained image recognition is performed, the image obtaining unit 801 obtains the to-be-recognized image, and then sends the image to the image recognizing unit 802, and the image recognizing unit 802 may input the to-be-recognized image to the fine-grained image recognition model. Assuming that the fine-grained image recognition model comprises two branches, it is possible to obtain two features, perform classification for the to-be-recognized image in conjunction with the two features, and obtain and output the classification result.

In practical application, the above pre-processing unit 800 may be the apparatus shown in FIG. 7.

Reference may be made to corresponding depictions in the aforesaid method embodiments for a specific workflow of the apparatus embodiments shown in FIG. 7 and FIG. 8. The workflow is not detailed any more.

To sum up, according to the solutions in the above apparatus embodiments, when the fine-grained image recognition model is trained, it is unnecessary to perform manual annotation for object parts, thereby saving manpower costs and improving the model training efficiency. Furthermore, it is possible to, by performing constraint at the feature level, enable the fine-grained image recognition model to accurately position key object parts in the image, thereby ensuring the accuracy of the fine-grained image recognition results. In addition, the solutions in the above apparatus embodiments can be very easily extended to large vertical classes of the fine-grained image recognition, for example, animals, flowers, vehicles and dishes, and has broad applicability.

Figure 9:
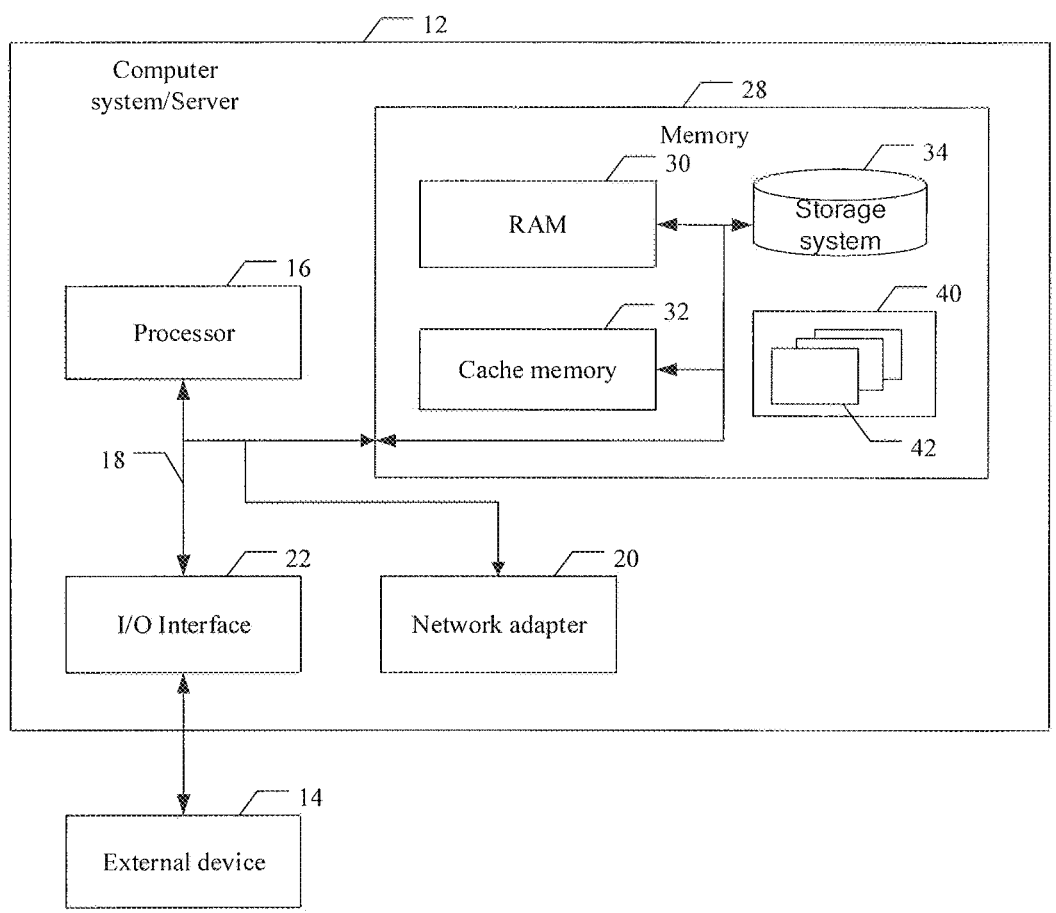
FIG. 9 illustrates a block diagram of an example computer system/server 12 adapted to implement an implementation mode of the present disclosure.

FIG. 9 illustrates a block diagram of an example computer system/server 12 adapted to implement an implementation mode of the present disclosure. The computer system/server 12 shown in FIG. 9 is only an example and should not bring about any limitation to the function and scope of use of the embodiments of the present disclosure.

As shown in FIG. 9, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 9 and typically called a "hard drive"). Although not shown in FIG. 9, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 9, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiment shown in FIG. 1 or FIG. 6.

The present disclosure meanwhile provides a computer-readable storage medium on which a computer program is stored, the program, when executed by the processor, implementing the method stated in the embodiment shown in FIG. 1 or FIG. 6.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for training a fine-grained image recognition model, wherein the method comprises:
obtaining images as training samples, and respectively obtaining a tag corresponding to each image, the tag including a class to which the image belongs;
training according to the training samples and corresponding tags to obtain a fine-grained image recognition model, and performing constraint at a feature level from two dimensions, namely, the class and object parts, during the training, so that the fine-grained image recognition model learns key object parts in the images, and completes fine-grained image classification according to the key object parts,
wherein the performing constraint at a feature level from two dimensions, namely, the class and object parts, comprises:
a distance between two features extracted from the same object part in the images in the same class simultaneously satisfies: smaller than a distance between two features extracted from different object parts in the images in the same class; smaller than a distance between two features extracted from the same object part in the images in different classes; smaller than a distance between two features extracted from different object parts in the images in different classes;
a distance between two features extracted from different object parts in the images in the same class satisfies: smaller than a distance between two features extracted from different object parts in the images in different classes;
a distance between two features extracted from the same object part in the images in different classes satisfies:

smaller than a distance between two features extracted from different object parts in the images in different classes.

2. The method according to claim 1, wherein
the fine-grained image recognition model at least comprises two branches;
during training, regarding each image, each branch performs feature extraction for one object part in the image;
upon completion of the training, each branch respectively learns different key object parts in the image, so as to complete fine-grained image classification in combination with features extracted by each branch.

3. A fine-grained image recognition method, wherein the method comprises:
obtaining a to-be-recognized image;
inputting the to-be-recognized image to a fine-grained image recognition model obtained by pre-training, so that the fine-grained image recognition model positions key object parts in the image, and completes fine-grained image classification according to the key object parts, and outputs a classification result,
wherein the fine-grained image recognition model is trained by:
obtaining images as training samples, and respectively obtaining a tag corresponding to each image, the tag including a class to which the image belongs;
training according to the training samples and corresponding tags to obtain the fine-grained image recognition model, and performing constraint at a feature level from two dimensions, namely, the class and object parts, during the training, so that the fine-grained image recognition model learns key object parts in the images, and completes fine-grained image classification according to the key object parts; and
wherein the performing constraint at a feature level from two dimensions, namely, the class and object parts, comprises:
a distance between two features extracted from the same object part in the images in the same class simultaneously satisfies: smaller than a distance between two features extracted from different object parts in the images in the same class; smaller than a distance between two features extracted from the same object part in the images in different classes; smaller than a distance between two features extracted from different object parts in the images in different classes;
a distance between two features extracted from different object parts in the images in the same class satisfies: smaller than a distance between two features extracted from different object parts in the images in different classes;
a distance between two features extracted from the same object part in the images in different classes satisfies: smaller than a distance between two features extracted from different object parts in the images in different classes.

4. The method according to claim 3, wherein
the fine-grained image recognition model at least comprises two branches;
during training, regarding each image, each branch performs feature extraction for one object part in the image;
upon completion of the training, each branch respectively learns different key object parts in the image, so as to complete fine-grained image classification in combination with features extracted by each branch.

5. A computer device, comprising a memory, a processor and a computer program which is stored on the memory and runs on the processor, wherein the processor, upon executing the program, implements a method for training a fine-grained image recognition model, wherein the method comprises:
obtaining images as training samples, and respectively obtaining a tag corresponding to each image, the tag including a class to which the image belongs;
training according to the training samples and corresponding tags to obtain a fine-grained image recognition model, and performing constraint at a feature level from two dimensions, namely, the class and object parts, during the training, so that the fine-grained image recognition model learns key object parts in the images, and completes fine-grained image classification according to the key object parts,
wherein the performing constraint at a feature level from two dimensions, namely, the class and object parts, comprises:
a distance between two features extracted from the same object part in the images in the same class simultaneously satisfies: smaller than a distance between two features extracted from different object parts in the images in the same class; smaller than a distance between two features extracted from the same object part in the images in different classes; smaller than a distance between two features extracted from different object parts in the images in different classes;
a distance between two features extracted from different object parts in the images in the same class satisfies: smaller than a distance between two features extracted from different object parts in the images in different classes;
a distance between two features extracted from the same object part in the images in different classes satisfies: smaller than a distance between two features extracted from different object parts in the images in different classes.

6. The computer device according to claim 5, wherein
the fine-grained image recognition model at least comprises two branches;
during training, regarding each image, each branch performs feature extraction for one object part in the image;
upon completion of the training, each branch respectively learns different key object parts in the image, so as to complete fine-grained image classification in combination with features extracted by each branch.

7. A non-transitory computer-readable storage medium on which a computer program is stored, wherein the program, when executed by a processor, implements a method for training a fine-grained image recognition model, wherein the method comprises:
obtaining images as training samples, and respectively obtaining a tag corresponding to each image, the tag including a class to which the image belongs;
training according to the training samples and corresponding tags to obtain a fine-grained image recognition model, and performing constraint at a feature level from two dimensions, namely, the class and object parts, during the training, so that the fine-grained image recognition model learns key object parts in the images, and completes fine-grained image classification according to the key object parts,
wherein the performing constraint at a feature level from two dimensions, namely, the class and object parts, comprises:
a distance between two features extracted from the same object part in the images in the same class simultaneously satisfies: smaller than a distance between two features extracted from different object parts in the images in the same class; smaller than a distance between two features extracted from the same object part in the images in different classes; smaller than a distance between two features extracted from different object parts in the images in different classes;

a distance between two features extracted from different object parts in the images in the same class satisfies: smaller than a distance between two features extracted from different object parts in the images in different classes;

a distance between two features extracted from the same object part in the images in different classes satisfies: smaller than a distance between two features extracted from different object parts in the images in different classes.

8. The non-transitory computer-readable storage medium according to claim 7, wherein the fine-grained image recognition model at least comprises two branches;

during training, regarding each image, each branch performs feature extraction for one object part in the image;

upon completion of the training, each branch respectively learns different key object parts in the image, so as to complete fine-grained image classification in combination with features extracted by each branch.

9. A computer device, comprising a memory, a processor and a computer program which is stored on the memory and runs on the processor, wherein the processor, upon executing the program, implements a fine-grained image recognition method, wherein the method comprises:

obtaining a to-be-recognized image;

inputting the to-be-recognized image to a fine-grained image recognition model obtained by pre-training, so that the fine-grained image recognition model positions key object parts in the image, and completes fine-grained image classification according to the key object parts, and outputs a classification result, wherein the fine-grained image recognition model is trained by:

obtaining images as training samples, and respectively obtaining a tag corresponding to each image, the tag including a class to which the image belongs;

training according to the training samples and corresponding tags to obtain the fine-grained image recognition model, and performing constraint at a feature level from two dimensions, namely, the class and object parts, during the training, so that the fine-grained image recognition model learns key object parts in the images, and completes fine-grained image classification according to the key object parts; and wherein the performing constraint at a feature level from two dimensions, namely, the class and object parts, comprises:

a distance between two features extracted from the same object part in the images in the same class simultaneously satisfies: smaller than a distance between two features extracted from different object parts in the images in the same class; smaller than a distance between two features extracted from the same object part in the images in different classes; smaller than a distance between two features extracted from different object parts in the images in different classes;

a distance between two features extracted from different object parts in the images in the same class satisfies: smaller than a distance between two features extracted from different object parts in the images in different classes;

a distance between two features extracted from the same object part in the images in different classes satisfies: smaller than a distance between two features extracted from different object parts in the images in different classes.

10. The computer device according to claim 9, wherein the fine-grained image recognition model at least comprises two branches;

during training, regarding each image, each branch performs feature extraction for one object part in the image;

upon completion of the training, each branch respectively learns different key object parts in the image, so as to complete fine-grained image classification in combination with features extracted by each branch.

11. A non-transitory computer-readable storage medium on which a computer program is stored, wherein the program, when executed by a processor, implements a fine-grained image recognition method, wherein the method comprises:

obtaining a to-be-recognized image;

inputting the to-be-recognized image to a fine-grained image recognition model obtained by pre-training, so that the fine-grained image recognition model positions key object parts in the image, and completes fine-grained image classification according to the key object parts, and outputs a classification result, wherein the fine-grained image recognition model is trained by:

obtaining images as training samples, and respectively obtaining a tag corresponding to each image, the tag including a class to which the image belongs;

training according to the training samples and corresponding tags to obtain the fine-grained image recognition model, and performing constraint at a feature level from two dimensions, namely, the class and object parts, during the training, so that the fine-grained image recognition model learns key object parts in the images, and completes fine-grained image classification according to the key object parts; and wherein the performing constraint at a feature level from two dimensions, namely, the class and object parts, comprises:

a distance between two features extracted from the same object part in the images in the same class simultaneously satisfies: smaller than a distance between two features extracted from different object parts in the images in the same class; smaller than a distance between two features extracted from the same object part in the images in different classes; smaller than a distance between two features extracted from different object parts in the images in different classes;

a distance between two features extracted from different object parts in the images in the same class satisfies: smaller than a distance between two features extracted from different object parts in the images in different classes;

a distance between two features extracted from the same object part in the images in different classes satisfies: smaller than a distance between two features extracted from different object parts in the images in different classes.

* * * * *